(12) United States Patent
Paskell

(10) Patent No.: US 12,049,273 B2
(45) Date of Patent: *Jul. 30, 2024

(54) METHOD AND SYSTEM FOR A VEHICLE DECKING PROCESS ASSOCIATED WITH MANUFACTURING A VEHICLE

(71) Applicant: Ford Global Technologies, LLC, Dearborn, MI (US)

(72) Inventor: Kerry Lance Paskell, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,477

(22) Filed: Feb. 23, 2023

(65) Prior Publication Data

US 2023/0365210 A1 Nov. 16, 2023

Related U.S. Application Data

(63) Continuation of application No. 17/743,265, filed on May 12, 2022, now Pat. No. 11,613,321.

(51) Int. Cl.
*B62D 65/18* (2006.01)
(52) U.S. Cl.
CPC .................... *B62D 65/18* (2013.01)
(58) Field of Classification Search
CPC ......... G05D 2201/0216; G05D 1/0088; B62D 65/022; B62D 65/18; Y02P 90/60; Y02P 90/02; Y02P 90/30
See application file for complete search history.

(56) References Cited

U.S. PATENT DOCUMENTS 11,613,321 B1 * 3/2023 Paskell .................. B62D 65/18
29/430

FOREIGN PATENT DOCUMENTS

CN 217170859 U * 8/2022

OTHER PUBLICATIONS

Wang et al.; CN-217170859-U; Machine translation (Year: 2022).*

* cited by examiner

*Primary Examiner* — Lee A Holly
(74) *Attorney, Agent, or Firm* — Burris Law, PLLC

(57) ABSTRACT

A manufacturing system includes a plurality of first autonomous mobile robots (AMRs), a plurality of second AMRs, and a central management system. Each first AMR transports a body from among multiple bodies for multiple vehicles, and each second AMR transports a chassis from multiple chassis for the multiple vehicles. The central management system is configured to direct the plurality of the first AMRs into a first assembly line process, direct the plurality of the second AMRs into a second assembly line process, and direct an identified second AMR of the plurality of the second AMRs to move behind an identified first AMR of the plurality of the first AMRs. The identified second AMR is transporting a selected chassis from among the plurality of chassis, the identified first AMR is transporting a selected body from among the plurality of bodies, and the selected body is associated with the selected chassis.

20 Claims, 7 Drawing Sheets

METHOD AND SYSTEM FOR A VEHICLE DECKING PROCESS ASSOCIATED WITH MANUFACTURING A VEHICLE

CROSS-REFERENCE TO RELATED APPLICATIONS

This application is a continuation of U.S. patent application Ser. No. 17/743,265 filed May 12, 2022, and titled "METHOD AND SYSTEM FOR A VEHICLE DECKING PROCESS ASSOCIATED WITH MANUFACTURING A VEHICLE". The disclosure of the above application is incorporated herein by reference.

FIELD

The present disclosure relates to a method for a vehicle decking process associated with a manufacturing a vehicle.

BACKGROUND

The statements in this section merely provide background information related to the present disclosure and may not constitute prior art.

Manufacturing facilities use production and assembly tools to aid in the production and manufacture of products. These manufacturing production and assembly tools include stationary robotic arms and lift assist devices that occupy a large amount of dedicated space within a manufacturing facility. Generally, bolted or welded to the ceiling and/or floors, these production and assembly tools can also become permanent fixtures of the manufacturing facility and inhibit flexibility needed to quickly modify and/or change assembly lines. These and other issues are addressed by the teachings of the present disclosure.

SUMMARY

This section provides a general summary of the disclosure and is not a comprehensive disclosure of its full scope or all of its features.

In one form, the present disclosure is directed to a manufacturing system including a plurality of first autonomous mobile robots (AMRs), a plurality of second AMRs, and a central management system. Each first autonomous mobile robot (AMR) is configured to transport a body from among a plurality of bodies for a plurality of vehicles, and each second AMR is configured to transport a chassis from a plurality of chassis for the plurality of vehicle. The central management system includes one or more processors and one or more non-transitory computer-readable mediums storing instructions that are executable by the one or more processors. The instructions include: directing the plurality of the first AMRs into a first assembly line process; directing the plurality of the second AMRs into a second assembly line process; and directing an identified second AMR of the plurality of the second AMRs to move behind an identified first AMR of the plurality of the first AMRs. The identified second AMR is transporting a selected chassis from among the plurality of chassis, the identified first AMR is transporting a selected body from among the plurality of bodies, and the selected body is associated with the selected chassis.

The following paragraph includes variations of the manufacturing system of the above paragraph, and the variations may be implemented individually or in any combination while remaining within the scope of the present disclosure.

In some variations, the system further includes a first set of mobile robotic systems provided at an assembly area and configured to move the body, and the instructions further includes: having the first set of mobile robotic systems lift the body from the identified first AMR; directing the identified first AMR to a secondary area; directing the identified second AMR to move to a desired position relative to the body; and instructing the first set of mobile robotic systems to place the body on the chassis. In some variations, the system further includes one or more positional sensors provided at the assembly area and configured to detect a component in the assembly area, where the component is at least one of the body and the chassis. In some variations, the instructions further includes: determining a component position of the component provided at the assembly area; determining whether the component is aligned with a reference position based on the component position; and directing a component AMR to move the component to the reference position in response to the component not being aligned with the reference position. The component AMR is the identified first AMR in response to the component being the body and the component AMR is the identified second AMR in response to the component being the chassis. In some variations, each first AMR transporting a body among the plurality of bodies is configured to store a body identification data associated with the body being transported, and each second AMR transporting a chassis among the plurality of chassis is configured to store a chassis identification data associated with the chassis being transported. In some variations, in the instructions further include: obtaining the body identification data and the chassis identification data from a desired first AMR from among the plurality of first AMRs and a desired second AMR from among the plurality of second AMRs, respectively; determining whether the body transported by the desired first AMR is associated the chassis being transported on the desired second AMR based on the body identification data and the chassis identification data; directing at least one of the desired first AMR and the desired second AMR to a secondary area in response to the body not being associated with the chassis; and having the desired second AMR, as the identified second AMR, positioned directly behind the desired first AMR, as the identified first AMR, in response to the body being associated with the chassis. In some variations, to have the desired second AMR positioned directly behind the desired first AMR, the instructions further include directing the desired second AMR to move directly behind the desired first AMR. In some variations, to have the desired second AMR positioned directly behind the desired first AMR, the instructions further include directing the desired first AMR to move directly in front of the desired second AMR. In some variations, the system further includes a second set of mobile robotic systems configured to couple the body to the chassis. In some variations, with the body placed on the chassis, the instructions further includes instructing the second set of mobile robotic systems to fasten the body to the chassis.

In one form, the present disclosure is directed to a method for manufacturing a vehicle using a manufacturing system having a plurality of first autonomous mobile robots (AMRs) transporting a plurality of bodies for a plurality of vehicles, a plurality of second AMRs transporting a plurality of chassis for the plurality of vehicles, and a central management system. The method includes: directing, by the central management system, the plurality of first AMRs into a first assembly line process, where each first autonomous mobile robot (AMR) is configured to transport a body from among the plurality of bodies; directing, by the central management system, the plurality of the second AMRs into a second assembly line process, where each second AMR is configured to transport a chassis from the plurality of chassis; and having, by the central management system, an identified second AMR from among the plurality of the second AMRs to move behind an identified first AMR from among the plurality of the first AMRs, where the identified second AMR is transporting a selected chassis from among the plurality of chassis, the identified first AMR is transporting a selected body from among the plurality of bodies, where the selected body is associated with the selected chassis.

The following paragraph includes variations of the method of the above paragraph, and the variations may be implemented individually or in any combination while remaining within the scope of the present disclosure.

In some variations, the manufacturing system further includes a first set of mobile robotic systems provided at an assembly area and configured to move the body, and the method further includes: instructing, by the central management system, the first set of mobile robotic systems to lift the body from the identified first AMR; directing, by the central management system, the identified first AMR to a secondary area; directing, by the central management system, the identified second AMR to move to a desired position relative to the body; and instructing, by the central management system, the first set of mobile robotic systems to place the body on the chassis. In some variations, the manufacturing system further includes one or more positional sensors provided at the assembly area and configured to detect a component in an assembly area, and the method further include: determining, by the central management system, a component position of the component provided at the assembly area, where the component is at least one of the body and the chassis; determining, by the central management system, whether the component is aligned with a reference position based on the component position; and directing, by the central management system, a component AMR to move the component to the reference position in response to the component not being aligned with the reference position, where the component AMR is the first AMR in response to the component being the body and the component AMR is the second AMR in response to the component being the chassis. In some variations, the method further includes: storing, by each first AMR transporting a body among the plurality of bodies, a body identification data associated with the body being transported, and storing, by each second AMR transporting a chassis among the plurality of chassis, a chassis identification data associated with the chassis being transported. In some variations, the method further includes: obtaining, by the central management system, the body identification data and the chassis identification data from a desired first AMR from among the plurality of first AMRs and a desired second AMR from among the plurality of second AMRs, respectively; determining, by the central management system, whether the body transported by the desired first AMR is associated the chassis being transported on the desired second AMR based on the body identification data and the chassis identification data; directing, by the central management system, at least one of the desired first AMR and the desired second AMR to a secondary area in response to the body not being associated with the chassis; and having, by the central management system, the desired second AMR, as the identified second AMR, positioned directly behind the desired first AMR, as the identified first AMR, in response to the body being associated with the chassis. In some variations, to have the desired second AMR positioned directly behind the desired first AMR, the method further includes directing the desired second AMR to move directly behind the desired first AMR. In some variations, to have the desired second AMR positioned directly behind the desired first AMR, the method further includes directing the desired first AMR to move directly in front of the desired second AMR. In some variations, the manufacturing system further includes a second set of mobile robotic systems configured to fasten the body to the chassis, and the method further includes, with the body placed on the chassis, instructing the second set of mobile robotic systems to fasten the body to the chassis.

In one form, the present disclosure is directed to a manufacturing system including a plurality of first autonomous mobile robots (AMRs), a plurality of second AMRs, and a central management system. Each first autonomous mobile robot (AMR) is configured to transport a body from among a plurality of bodies for a plurality of vehicles and is configured to store a body identification data associated with the body being transported. Each second AMR is configured to transport a chassis from a plurality of chassis for the plurality of vehicles and is configured to store a chassis identification data associated with the chassis being transported. The central management system includes one or more processors and one or more nontransitory computer-readable mediums storing instructions that are executable by the one or more processors. The instructions include: directing the plurality of the first AMRs into a first assembly line process; directing the plurality of the second AMRs into a second assembly line process; obtaining the body identification data and the chassis identification data from a desired first AMR from among the plurality of first AMRs and a desired second AMR from among the plurality of second AMRs, respectively; determining whether the body transported by the desired first AMR is associated the chassis being transported on the desired second AMR based on the body identification data and the chassis identification data; directing at least one of the desired first AMR and the desired second AMR to a secondary area in response to the body not being associated with the chassis; and having the desired second AMR, as an identified second AMR, positioned directly behind the desired first AMR, as an identified first AMR, in response to the body being associated with the chassis.

In some variations, the system further includes a first set of mobile robotic systems provided at an assembly area and configured to move the body, and the instructions further include: having the first set of mobile robotic systems lift the body from the identified first AMR; directing the identified first AMR to the secondary area; directing the identified second AMR to move to a desired position relative to the body; and instructing the first set of mobile robotic systems to place the body on the chassis.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 8A:
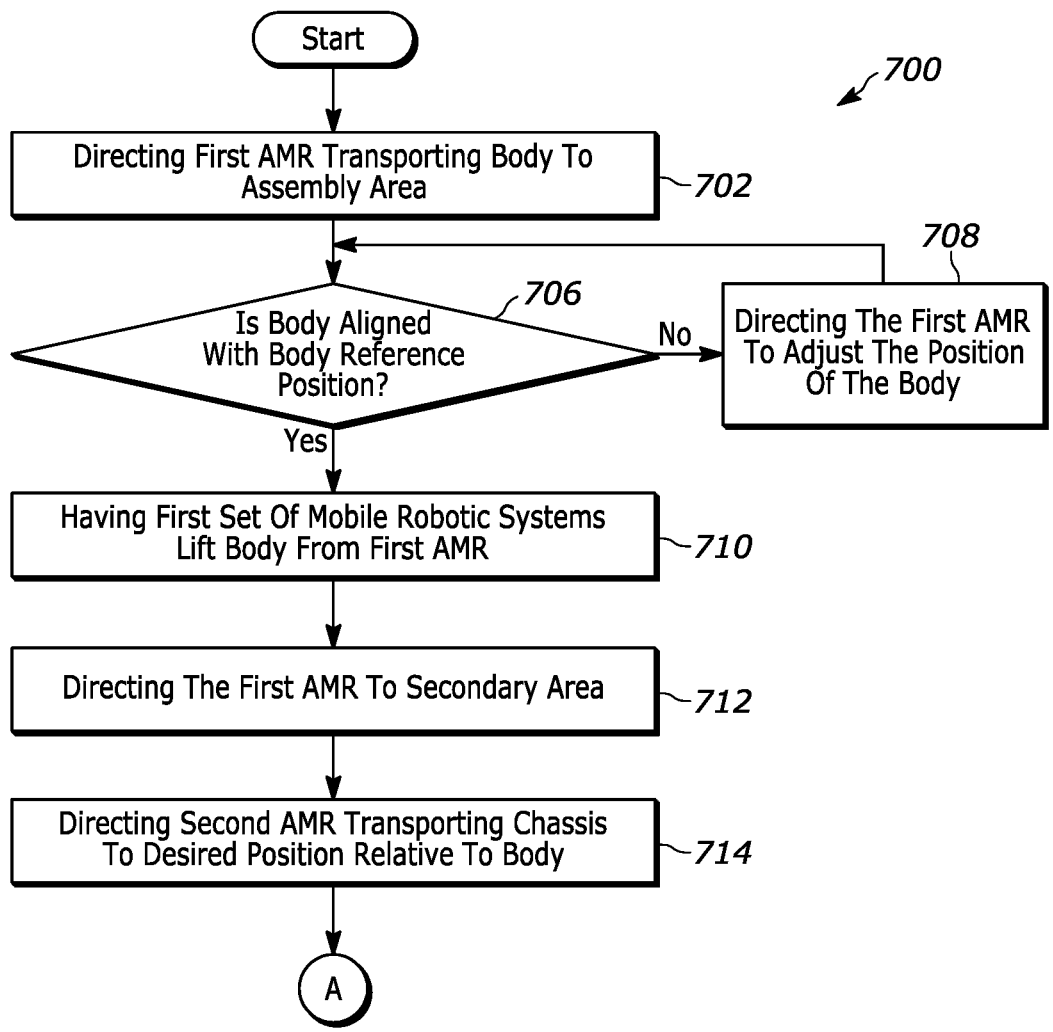
Figure 8B:
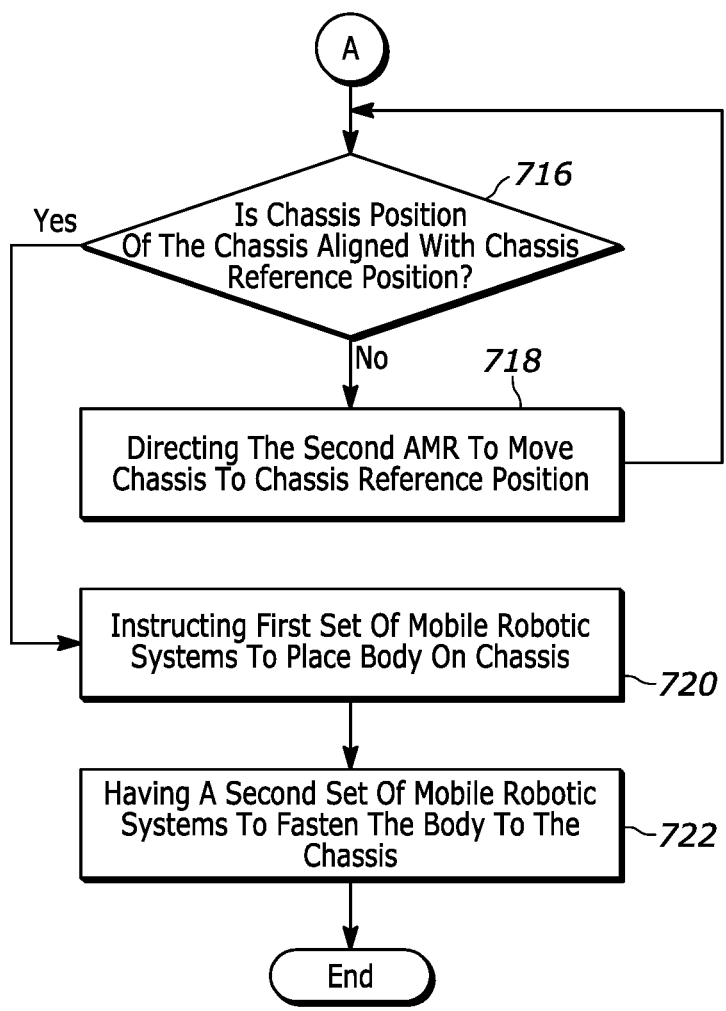

FIGS. 8A and 8B provide a flowchart of a vehicle decking routine, according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a flexible-mobile manufacturing system operating within a manufacturing environment. The system includes a central management system that directs a first autonomous mobile robot (AMR) transporting a body and a second AMR transporting a chassis to a predetermined location. Once positioned, the central management system has a mobile robotic system to lift the body from the first AMR and position the body onto the chassis provided on the second AMR. Among other attributes, the manufacturing system of the present disclosure may provide a reconfigurable and adaptable manufacturing assembly of a body and a chassis for a selected vehicle.

Figure 1:
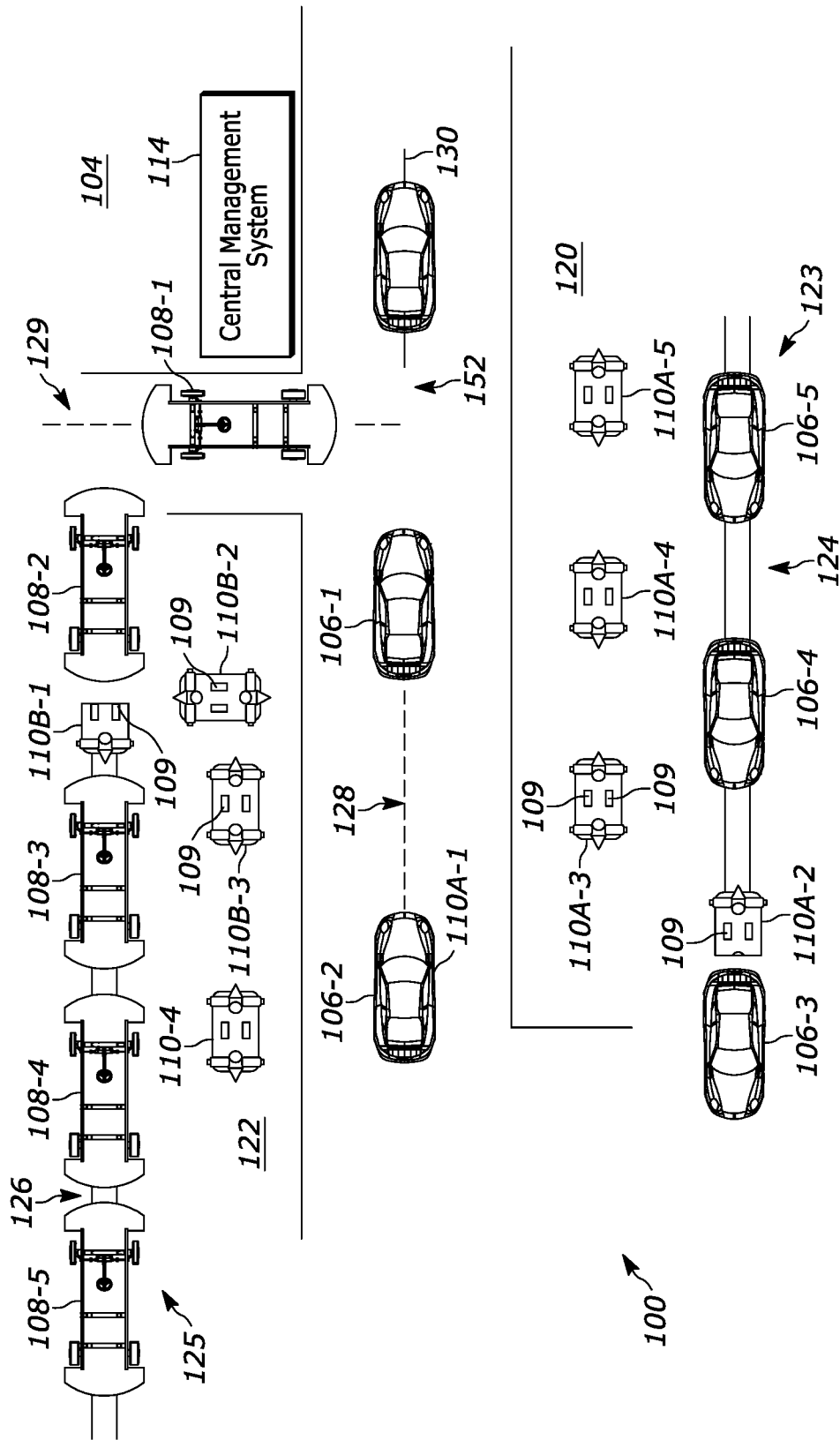
FIG. 1 is a block diagram of a manufacturing system in accordance with the teaching of the present disclosure.
Figure 2:
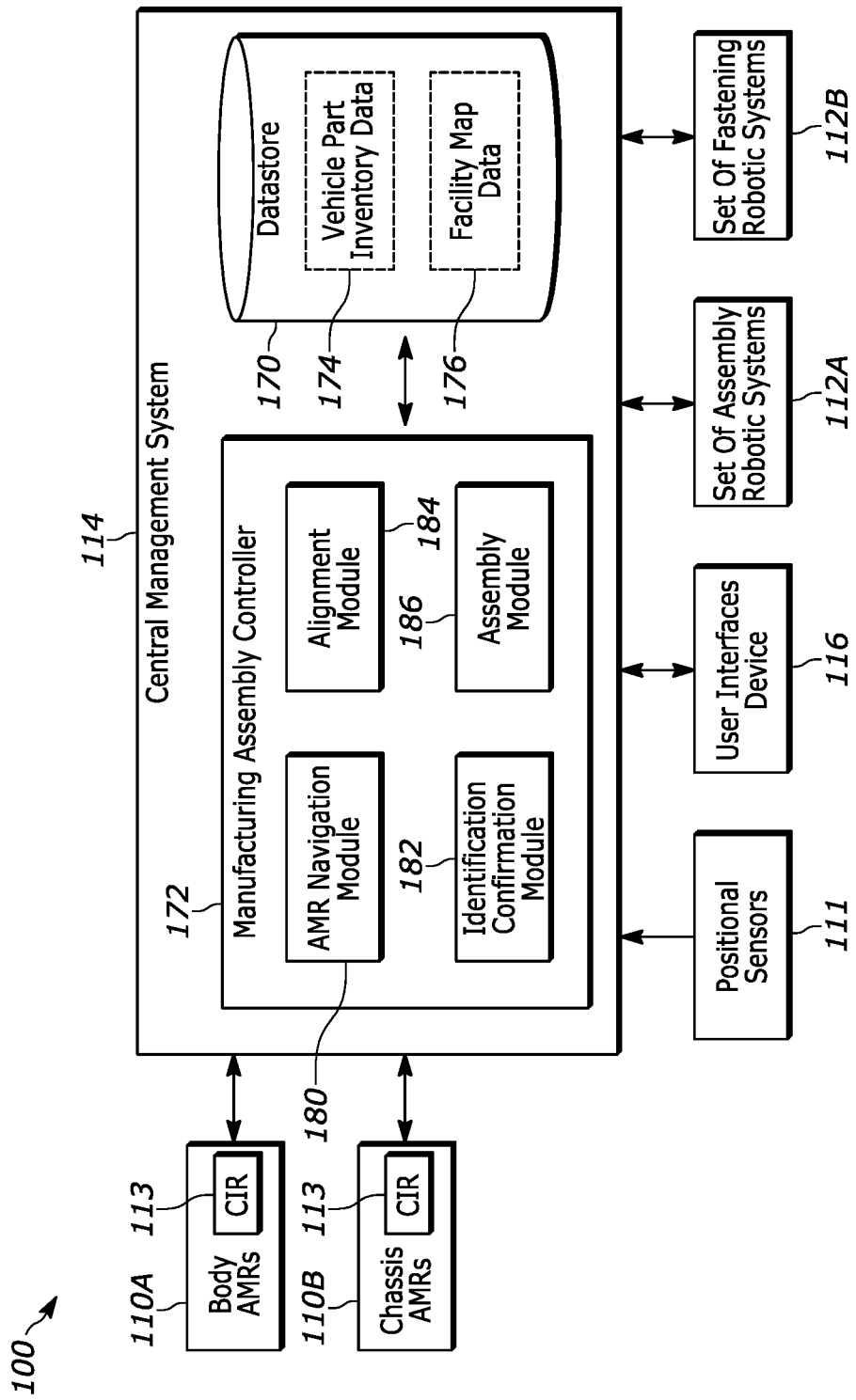
FIG. 2 is an illustrative diagram of a section of a manufacturing environment disclosing the manufacturing system having a first autonomous mobile robot (AMR) and a second AMR transporting a body and a chassis, respectively in accordance with teachings of the present disclosure.

Referring to FIGS. 1 and 2 a flexible-mobile manufacturing system 100 for manufacturing a vehicle provided within a manufacturing environment or facility 104 is provided. The manufacturing system 100 is configured to assemble a plurality of bodies 106-1, 106-2, 106-3, 106-4, 106-5 (e.g., top hats for vehicles) ("bodies 106", collectively) with a plurality of chassis 108-1, 108-2, 108-3, 108-4, 108-5 ("chassis 108," collectively) for a plurality of vehicles. As described in detail herein, the flexible-mobile manufacturing system 100 is configured to assemble a body 106 and a chassis 108 for a respective vehicle using autonomous mobile robots. In the following, the body 106 and the chassis 108 for a respective vehicle may be collectively referenced as components 106, 108.

In an example application, each body 106 may have specific style or structure for a specific make and model of vehicle. In one form, the body 106 may include an alignment feature (not shown) used to align the body 106 to a predetermined body reference position during assembly of the body 106 to the chassis 108. For example, the alignment feature may include, at least one of a reflector tag, an ultrasonic object, an RF, tag, and optical tag and/or the like. In another example, the alignment feature may be a physical feature of the body such as an opening, a specific surface, among others.

In one form, the chassis 108 is typically a load-bearing foundational frame that supports a vehicle from underneath and the body 106 is mounted to thereon. In one form, the chassis 108 has an alignment feature (not shown) used to align the chassis 108 with a predetermined chassis reference location during assembly of the body 106 to the chassis 108. Similar to the body 106, the alignment feature may be at least one of a reflector tag, an ultrasonic object, a RF tag, an optical tag, and/or the like. In another form, the alignment feature may be a physical feature of the body 106, such as, an opening, a specific surface among other things. In one form, each chassis 108 includes a plurality of fastening holes (not shown).

Referring to FIG. 2, in one form, the flexible-mobile manufacturing system 100 includes a plurality of autonomous mobile robots (AMRs) 110A, 110b ("AMR 110", collectively), a plurality of positional sensors 111-1, 111-2, 111-3, 111-4 ("positional sensors 111", collectively), a set of body assembly robotic systems 112A, a set of fastening robotic systems 112b, and a central management system 114. In one form, the manufacturing environment may include an optional user interface device 116. While the central management system 114 is illustrated as being at the manufacturing facility 104, it should be understood that the central management system 114 may be positioned remotely from the manufacturing facility 104. In one form, the AMRs 110, the set of body assembly robotic systems 112A, the set of fastening robotic systems 112B, the user interface device 116 and/or the central management system 114 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the AMRs 110 are mobile robots that are partially or fully autonomous to move to various locations of the manufacturing facility 104, and may also be referred to as autonomous guided vehicles. Generally and as known, the AMRs 110 may at least include a propulsion system, a steering system, a brake system, and a controller. The controller is configured to communicate with other devices/systems, such as the central management system 114 and to operate the propulsion system, the steering system, and the brake system to control movement of the AMR 110.

In one form, the AMRs 110 are configured to support and transport the component 106, 108. Accordingly, the AMRs 110 may include a support portion 109 upon which the component 106, 108 is positioned (see AMR 110B-4 of FIG. 1). In addition, to track which component is being transported, the AMRs 110 include a component identification register (CIR) 113, which may be provided as a memory circuit, for temporarily storing data related to the component being transferred. In the example application, AMR 110A-1, 110A-2, 110A-3, 110A-4, and 110A-5 transport the bodies 106 (collectively referred to as body AMRs 110A or first AMRs 110A), and AMRs 110B-1, 110B-2, 110B-3, 110B-4, 110B-5 transport the chassis (collectively chassis AMRs 110b or second AMRs).

Referring to FIG. 1, in an example application, the manufacturing facility 104 is configured to include a body staging area 120 and a chassis staging area 122 for the AMRs 110A and 110б obtaining a body 106 and a chassis 108, respectively. In one form, the body staging area 120 includes available AMRs 110A that are not transporting the bodies 106 (e.g., available AMRS 110A-3, 110A-4, and 110A-5) obtains bodies 106 from a body inventory area 123 at which the bodies 106 are held before assembly to the chassis 108. For example, the bodies 106 may be provided on a mobile conveyor system 124 and the body AMR 110A is configured to move under the body 106 to obtain the body 106. In one form, the AMR 110A receives a body identification data associated with the body 106 being transported and stores the body identification (ID) in the CIR 113. For example, a human operator may scan an ID tag (not shown) that is provided at the body 110A (e.g., a barcode or a quick response (QR) code) using a scanner to obtain the body ID and the wirelessly transmits the body ID to the AMR 110A via the scanner. In another example, the retrieval and transmission of the body ID may be automated using scanners fixed at certain location in the body staging area 120.

The chassis staging area 122 may be configured in similar manner as the body staging area 120. For example, the chassis staging area 122 may include a chassis inventory area 125 at which chassis 108 are held prior to assembly and are provided on a mobile conveyor system 126. The chassis AMRS 110б that are available may move under the chassis 108 to obtain the respective chassis. Similar to the body inventory area 123, the AMRs 110B receives a chassis ID data associated with the chassis 108 being transported and stores the chassis ID in the CIR 113.

It should be readily understood that the body staging area 120 and the chassis staging area 122 may be configured in various suitable ways and should not be limited to the example provided herein. For example, in lieu of a conveyor system, the components 106,108 may be provided to the AMRs 110 using one or industrial robotic arms that pick up the component 106,108 and place it on the respective AMR 110. In addition, the body staging area 120 may be configured in a different manner than that of the chassis staging area 122.

In one form, from the body staging area 120 and the chassis staging area 122, the AMRs 110A, 110B having the bodies 106/chassis 108 disposed thereon are configured to move to or form a body assembly line and a chassis assembly line, respectively (the body assembly line and the chassis assembly line are generally represented by dashed line 128 and dashed line 129, respectively). More particularly, it is known in the art, that the AMRs 110 can be configured to travel to specific area of a facility. In one example, the AMRs 110 can include detail maps and defined travel paths to travel to specific areas in the facility. Using known object detection sensors and processes, the AMRs 110 may be configured to perform certain actions based on the object detected and the location of the AMR within the facility. For example, the AMRs 110 may stop when an unrecognized object, such as a human, is detected and may follow an identified object, such as another AMR 110. In addition, as provided above, the AMRs 110 may be in communication with one another and may be able to exchange AMR ID information and the destination of the AMR 110. Accordingly, in one form, the AMRs 110 may be configured to travel in an organized manner to specific destinations.

In one form, the body ID data and the chassis ID data are employed to determine whether the body 106 having a respective body ID data and the chassis having the respective chassis ID data are associated with the same vehicle. In an example application, the body ID data and the chassis ID data may be indicative of a component part number for the respective component 106, 108, and if the part numbers are provided in a bill a material for the same vehicle, than the components 106, 108 are determined to be for the same vehicle and can be assembled, as described herein. In another example, the body ID data and the chassis ID data may include vehicle data identifying the vehicle that the component 106, 108 is associated with, and thus, if the vehicle data is the same, the components 106, 108 can be assembled.

As described in detail below, from the body assembly line 128 and the chassis assembly line 129, the body AMRs 110A and the chassis AMRs 110б form a component assembly line, which is generally represented by dashed line 130. In one form, in the component assembly line 130 the body AMRs 110A and the chassis AMRs 110б are arranged in alternating manner. More particularly, for a subject vehicle, the chassis AMR 110б transporting the chassis 108 for the subject vehicle is traveling directly behind the body AMR 110A transporting the body 106 for the subject vehicle.

Figure 3:
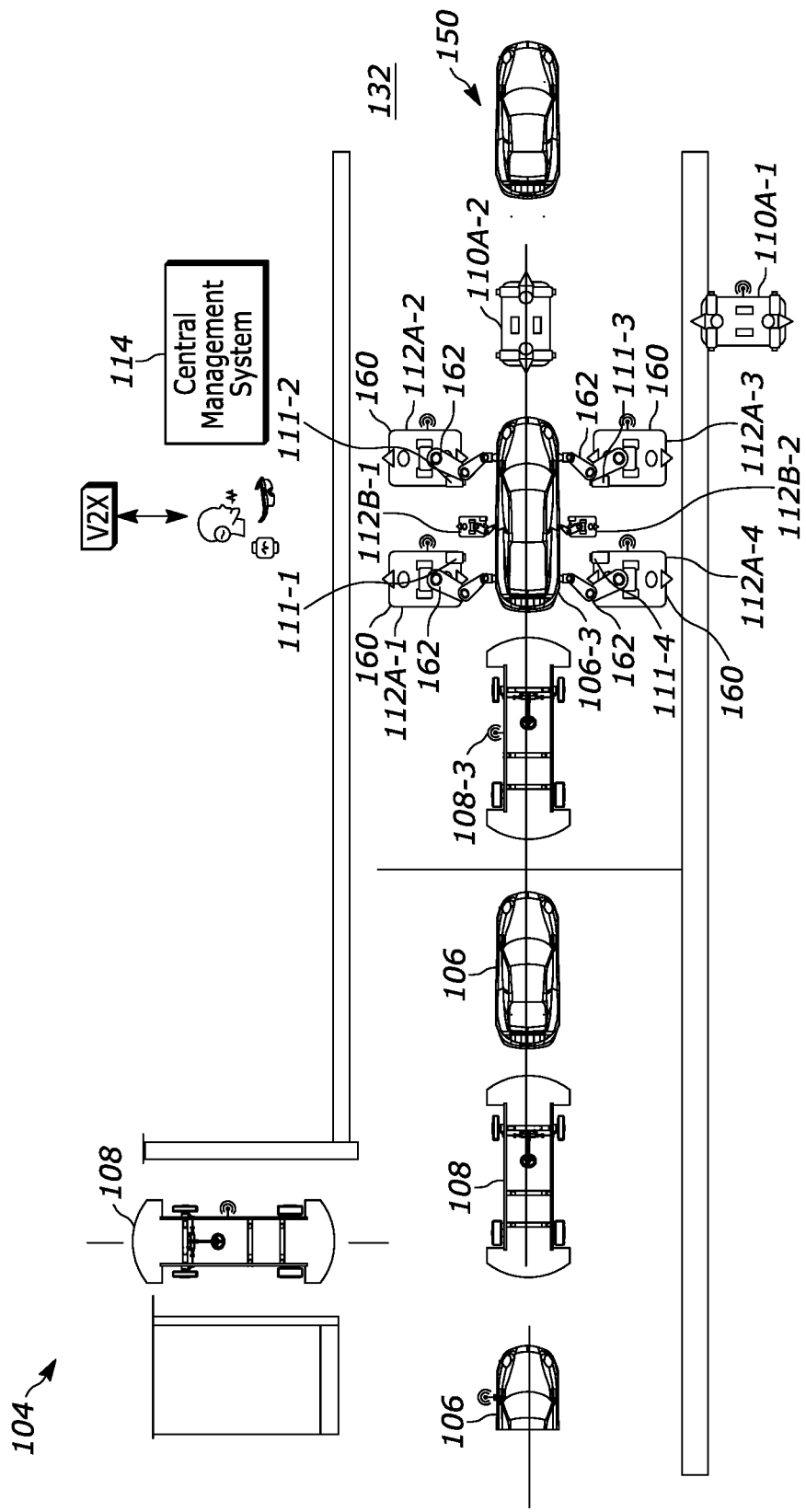
FIG. 3 is an illustrative diagram of another section of the manufacturing environment disclosing the manufacturing system having a plurality of assembly robotic systems securing the body to the chassis, according to the teachings of the present disclosure.

Referring to FIG. 3, the component assembly line 130 is configured to pass through an assembly area 132 at which the body 106 and the chassis 108 are assembled. In one form, the positional sensors 111, the set of body assembly robotic systems 112A, and the set of fastening robotic systems 112B area arranged at assembly area 130.

In one form, the one or more positional sensors 111 are configured to detect a component 106, 108) in the assembly area 132. In one example, the positional sensor 111 detects whether an alignment feature associated with the component 106, 108 is aligned with a respective component reference location. The component reference location includes a predetermined body reference location and/or a predetermined chassis reference location that is used to align the chassis 108 with the body 106 during an assembly operation. The positional sensor 111 may be provided as an inductive sensor, an optical sensor (e.g. optical scanner, laser sensor), a capacitive sensor, an image sensor (e.g. camera), a radar sensor, and/or an ultrasonic sensor.

In one form, the positional sensors 111 provided data indicative of a current location/position of the alignment feature of the component to the central management system 114. As described herein, the central management system 114, is configured to determine an offset value between the current location of the alignment feature with the component reference location. The offset value includes a directional offset and an adjustment offset value indicating the distance between the current location and the component reference location.

In an example application the positional sensor 111 is a camera configured to record a visual image of the alignment feature of the body 106 and/or the chassis 108 and output the image data to the central management system 114. In one form, the positional sensors 111 may be different types of sensors employed to detect the alignment feature. For example, the positional sensors 111 may include a camera and optical scanners to determine a position of component 106, 108 in the assembly area 132 using images from the camera and then verify the alignment feature is provided at the component reference locations using an optical scanner to scan a tag (e.g., barcode or QR-code). While specific positional sensors and method for aligning the component 106, 108 are provided herein, it should be readily understood that various other alignment methods using positional sensors may be employed.

In one form, the body assembly robotic system 112A and fastening robotic system 112B are provided as mobile robots and are collectively referred to as mobile robotic systems 112. In an example application, each of the mobile robotic systems 112 includes a mobile platform 160, a robotic arm 162 coupled to the mobile platform 160, and a system controller 163 (FIG. 4) configured to communicate with the central management system 114 and to control operation of the mobile platform 160 and the robotic arm 162. In one form, the mobile platform 160 is configured to move the mobile robotic systems 112 and may be an autonomous guided vehicles generally known to include wheels, propulsion systems, guiding sensors, such as radars, cameras etc. In one form, the robotic arm 162 is a multi-axis industrial robotic arm having multiple degree of freedom and includes an end-effector tool.

The set of body assembly robotic systems 112A is configured to move the body 106 and may be referred to as a first set of robotic systems. The set of fastening robotic system 112б is configured to fasten the body 106 and the chassis 108 and may be referred to as a second set of robotic systems. In one form, the mobile robotic systems 112 employed for the body assembly robotic system may be a different type (e.g., different brand, performance specifications, size, etc.) than that of the fastening robotic system. In the following the mobile platform 160, the robotic arm 162, and the system controller 163 for the body assembly robotic systems 112A and for the fastening robotic systems may further include the character "A" and "B", respectively to distinguish between the two set of mobile robotic systems.

Figures 4, 5, 6:
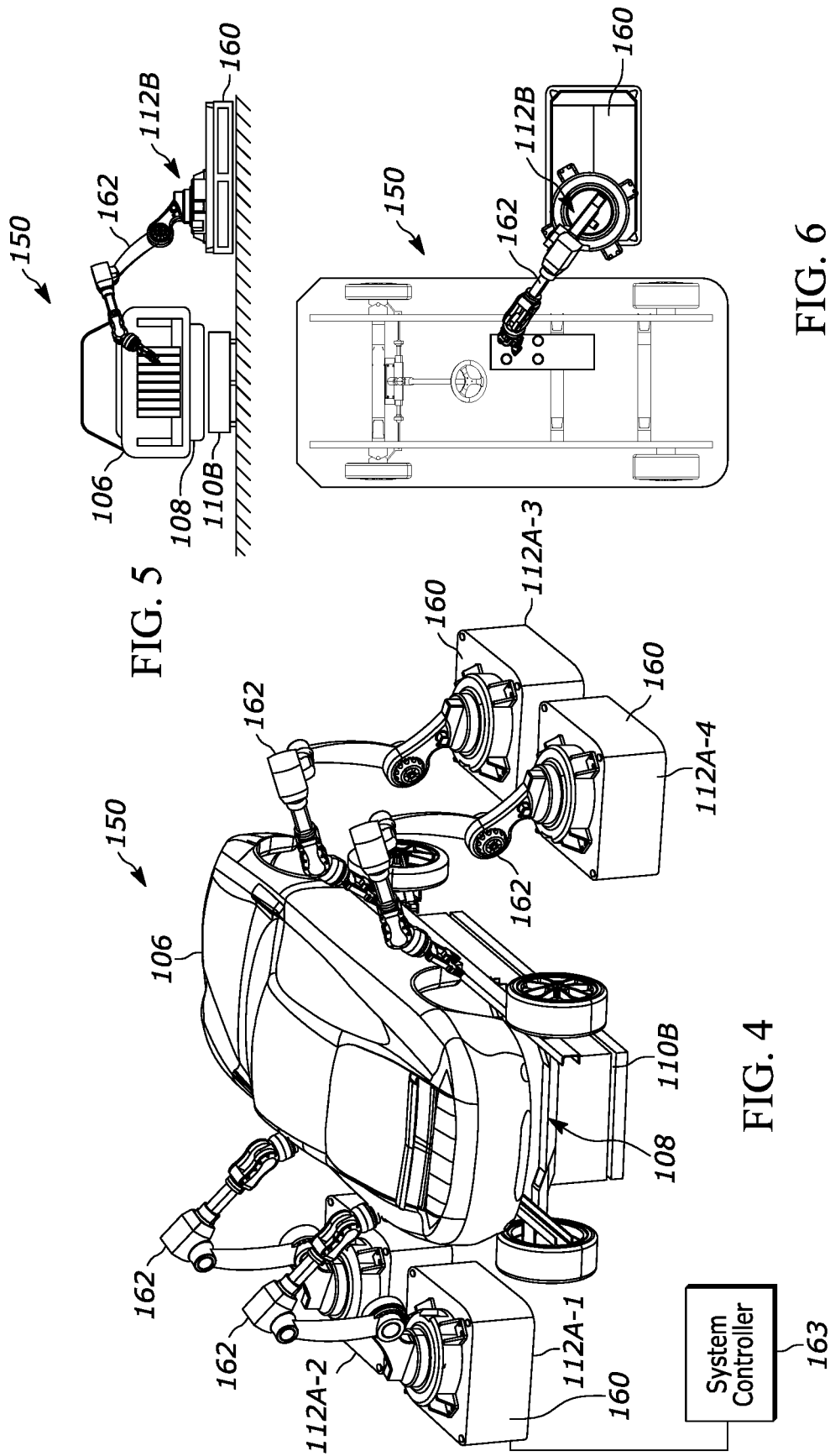
FIG. 4 is a perspective view of an illustrative diagram depicting a first set of the mobile robotic systems lowering a body unto a chassis according to the teachings of the present disclosure.
FIG. 5 is a side view of an illustrative diagram depicting a second set of mobile robotics systems securing the body to the chassis of FIG. 4, according to the teaching of the present disclosure.
FIG. 6 is a top view of the illustrative diagram of FIG. 5 depicting the second set of mobile robotic systems securing the body to the chassis, according to the teachings of the present disclosure.

Referring to FIG. 4, in an example application, the set of body assembly robotic systems 112A includes mobile robotic systems 112A-1, 112A-2, 112A-3, 112A-4 that are configured to lift and lower the body 106. The mobile robotic system 112A-1 and mobile robotic system 112A-2 are positioned on one side of an assembly line, and mobile robotic system 112A-3 and mobile robotic system 112A-4 are arranged on the other side of the assembly line opposing the mobile robotic systems 112A-1, 112A-2. In one form, the end-effector tools (not shown) of the robotic arms 162A are configured to contact and hold the body 106 and the robotic arm 162A operatively moves to lift and lower the body 106. The end-effector tools can be configured in various suitable ways to interact with the body 106, and thus, specific details regarding the structure of the end-effector tool is outside the scope of the present disclosure and thus, not described herein. In one form, the system controller 163A of the body assembly robotic system 112A is configured to control the multi-axis industrial robotic arms 162A perform a series of desired operations. For example, the system controller 163S may be configured to contact a pre-identified portion of the body 106 (e.g., underneath the body 106), synchronously move the body 106 away from the AMR 110A and with the chassis 108 aligned under the body 106, lower the body 106 onto the chassis 108.

While four mobile robotic systems 112A are provided as the set of body assembly robotic systems 112A, one or more mobile robotic systems 112A may be employed based on, for example, the size of the body 106 being assembly, the space available in the assembly area 132 among other factors. In addition, while each body assembly robotic system 112A is provided with its own system controller 163, the number of system controllers 163 may be consolidated, such that one or more system controllers may be employed to control two or more body assembly robotic systems 112A. Accordingly, the system controller 163 may be provided separate from the mobile platforms 160 and/or the robotic arms 162 but is communicably coupled to the mobile platform 160 and the robotic arms 162.

In one form, the set of fastening robotic systems 112б includes mobile robotic system 112B-1 and mobile robotic system 112B-2 to couple the body 106 to the chassis 108. For example, the body 106 and the chassis 108 may include a fastening feature such as a hole that is configured to receive a fastener such as screw. Accordingly, the end-effector tool of the fastening robotic systems 112б may be an automatic tool to obtain the fastener and secure the fastener to the fastening feature using a screwdriver type tool or a wrench type tool. It should be readily understood that the specific type of tool provided on the end-effector tool is dependent on the type of fastener used, and should not be limited to the examples provided herein.

In one form, the system controllers 163B of the fastening robotic systems 112B is configured to have the multi-axis industrial robotic arms 162 perform a series of desired operation to secure the body 106 and the chassis. For example, with the fastening robotic systems 112B provided at the assembly area 132, the system controller 163 operates the mobile platform 160 to move the fastening robotic system 112B in proximity of the body 106 and the chassis 108, and operates the robotic arm 162б having the end-effector to secure the body 106 and the chassis 108 to form a body-chassis combination 150. In one example, each of the robotic arms 162B install two fasteners through holes of the body 106 and the chassis 108. In one form, the body 106 and the chassis 108 are secured to reduce or inhibit relative movement between the components 106, 108. While four fasteners are employed, the any number of fasteners may be used to attach the body 106 and the chassis 108. In addition, while two fastening robotic systems 112B are illustrated one or more fastening robotic systems may be employed.

In one form, the system controllers 163 are configured to receive instructions from the central management system 114 to perform a desired operation, and once the operation is complete, the system controllers 163 may transmits notification to the central management system 114. The system controllers 163 may also notify the central management system 114 of any errors or abnormal operations detected at the robotic system 112.

Referring to FIG. 2, in one form, the central management system 114 is configured to execute a body-chassis assembly employing the ARMs 110 and the mobile robotic systems 112. In one example, the central management system 114 includes a datastore 170 and a manufacturing assembly controller 172. In one form, the datastore 170 includes a vehicle part inventory data 174 and a facility map data 176. The vehicle part inventory data 174 provides information related to the vehicle being formed in the manufacturing facility and more particularly, at least includes data indicative of a vehicle ID number and a vehicle parts list (e.g., a bill of material). In one form, the vehicle parts lines provides ID data at least some of the parts provided in the vehicle such as the part ID of the body 106 and the chassis 108. In one example, the datastore 170 stores and manages the facility map data 176 which includes data of the facility and ID for various areas of the facility 104 that can be used to direct the AMRs 110 and/or the mobile robotic systems 112 to a desired location in the facility 104.

Referring to FIG. 2, in one form, the manufacturing assembly controller 172 includes an AMR navigation module 180, an identification confirmation module 182, an alignment module 184 and an assembly module 186. In one form, the AMR navigation module 180 is configured to coordinate delivery and transport of the body 106 or the chassis 108 by the body AMR 110A and a chassis AMR 1106 from a respective staging area 120, 122 to the assembly area 132, respectively. To direct the AMRs 110, the AMR navigation module 180 is configured to transmit a transport command that requests the AMR 110 to travel to and/or along a desired area. For example, the body AMR 110A may provide a notification to the AMR navigation module 180 indicating that the AMR 110 has obtained the body 106, and the navigation module 180 may then instruct to AMR 110A to join the body assembly line 128 and travel to a component confirmation area that is generally provided by reference number 152. In lieu of or in addition to providing a specific location, the AMR navigation module 180 may instruct the body AMR 110 to follow a selected AMR 110. Accordingly, the AMR navigation module 180 may direct the AMRs 110 through the assembly process of the body 106 and the chassis 108.

The AMR navigation module 180 may track the location of the AMRS 110 using various suitable methods. For example, the AMRs 110 may routinely transmit data indicative of a current location of the AMR 110, and the AMR navigation module 180 may employ the data to track the location and movement of the AMR 110. In another example, each AMR 110 may include a location tracking device that automatically transmits data to the AMR navigation module 180. In one form, the AMR navigation module 180 may provide a travel path to the AMRs 110 to the assembly area. In another form, each of the AMRs 110 may utilize its internal mapping data and determine its respective travel path to the location provided in the transport.

In one form, the identification confirmation module 182 is configured to verify whether a specific body 106 and a specific chassis 108 are associated with one another. In one form, more particularly, prior to the body AMR 110A and the chassis AMR 1106 joining the component assembly line 130, the identification confirmation module 182 determines whether the body 106 transported by the body AMR 110A and the chassis 108 being transported on the chassis AMR 1106 are for the same vehicle 109 based on the body ID data and the chassis ID data. For example, when the body AMR 110A and the chassis AMR 1106 arrive at the component confirmation area 152, the identification confirmation module 182 transmits an ID data request signal to the body AMR 110A and the chassis AMR 1106, and the body AMR 110A and chassis AMR 1106 transmits the body ID data and the chassis ID data stored in respective CIR 113. Using the data in the vehicle part inventory 174, the identification confirmation module 182 determines if the body 106 and the chassis 108 are for the same vehicle. If the body 106 and the chassis 108 are for the same vehicle, the identification confirmation module 182 notifies the AMR navigation module 180 to direct the AMRs 110 to the component assembly line 130. For example, the navigation module 180 directs the body AMR 110A to process to the component assembly line 130 and to follow an identified chassis AMR 1106 and directs the chassis AMR 1106 to enter the component assembly line 130 after the body AMR 110A and to be behind the identified body AMR 110A. If the chassis ID data and the body ID data indicate that the chassis 108 and the body 106 are not for the same vehicle, the identification confirmation module 182 notifies the AMR navigation module 180 to have the AMRS 110 travel to, for example, respective staging areas for further processing.

In one form, the alignment module 184 is configured to determine whether components 106,108 are aligned at the assembly area 132 based on data from the positional sensors 111 and a respective component reference position. For example, the alignment module 184 receives data indicative of a position of the component 106, 108 from the positional sensors 111 and determines an offset between an alignment feature of the component 106, 108 and the component reference location. In one form, the component reference location is a predetermined location and may be provided as a defined coordinates within the assembly area 132 and/or a feature located within the assembly area 132 (e.g. one or more markings on a floor of the assembly area 132, an image on a camera lens, an image projected onto a surface of a body and/or chassis, a laser beam etc.).

In one example, as the body AMR 110A moves to a desired location within the assembly area 132, the positional sensors 111 are cameras that capture one or more images of an alignment feature of the body 106 and outputs image data in response thereof. The alignment module 184 receives the image data and performs well known image processing techniques to determine whether the alignment feature of the body 106 is located at the body reference location and/or an offset distance between the alignment feature and the body reference location, where the body reference location can be provided as marking at the assembly area and captured in the image. The alignment module 184 is configured to determine whether the offset distance is greater than an offset threshold, and if so, the alignment module 184 determines the body 106 is not aligned and the navigation module 180 directs the body AMR to move based on the offset distance.

In another example, the alignment feature may a QR-code on a tag and the positional sensor is a scanner to detect the QR code. If the alignment module 184 receives a signal from the positional sensor indicating the QR code is detected, the alignment module 184 determines the body is aligned. Alternatively, if no code is received after a predetermined of the body AMR 110A entering the component assembly area 130, the alignment module 184 is configured to notify the navigation module 180 to have the body AMR move to a desired location in the assembly area 132.

Similarly, the alignment module 184 performs an alignment verification to determine whether the chassis 108 is aligned in the assembly area 132 based on data from the positional sensor 111 and the chassis reference location. It should be readily understood that the alignment module 184 may be configured in various suitable ways based on the type of positional sensors 111 be employed, the alignment feature on the component 106, 108, and/or the component reference location.

In one form, the assembly module 186 is configured to instruct the mobile robotic systems 112 to perform selected tasks or specifically operations. In an example application, as provided above, the system controllers 163 of the mobile robotic systems 112 stores a series of operations to be performed by the robotic system. Accordingly, the assembly module 186 is configured to transmit a task command that indicates the task/operation to be performed by the robotic systems 112. For example, once the body 106 is aligned, as verified by the alignment module 184, the assembly module 186 has the body assembly robotic systems 112A lift the body 106 from the first AMR. In some applications, the system controllers 163A may notify the assembly module 186 of the central management system 114 that the body 106 is lifted and the navigation module 180 directs the body AMR to the body staging area 120 and directs the chassis AMR 1106 to the assembly area 13. With the chassis 108 aligned, the assembly module 186 is configured to instruct perform an assembly operation in which the body assembly robotic system 112A lowers and releases the body 106 onto the chassis 108. With body 106 on the chassis 108, the assembly module 186 may then instruct the fastening robotic systems 112B to perform a fastening operation to fasten the body 106 and the chassis 108, as described above. Once secured, the assembly module 186 may determine that the assembly is complete and the navigation module 180 provides a transport command to the chassis AMR 1106, which is now a body-chassis AMR 1106 to go to another area of the facility for further assembly of the vehicle.

In one form, the central management system 114 is also configured to communicate with a user via the user interface device 116 and accordingly, the user may direct some of the assembly of the body 106 and chassis 108, direct the AMRs 110 to move to a desired position, among perform other actions. In one form, the user interface device 116 can be a computing device, such as but not limited to, a laptop, a tablet. In one form, the user interface device 116 may include a voice to text feature configured to convert a user's speech to text. The voice to text features allowing the user to provide a vocal signal indicative of a command, request, and/or instructions to be executed by the central management system 114.

Referring to FIGS. 1 to 6, an example operation of the manufacturing system 100 is provided. With the body 106-3 provided on the body AMR 110A-1, the central management system 114 directs the body AMR 110A-1 to enter the body (first) assembly line 128 behind the AMR having body 106-2. Similarly, with the chassis 108-2 disposed on the chassis AMR 110B-1, the central management system 114 directs the chassis AMR 110B-1 to enter the chassis assembly line 129 behind the AMR 1106 having the chassis 108-1.

Figure 7:
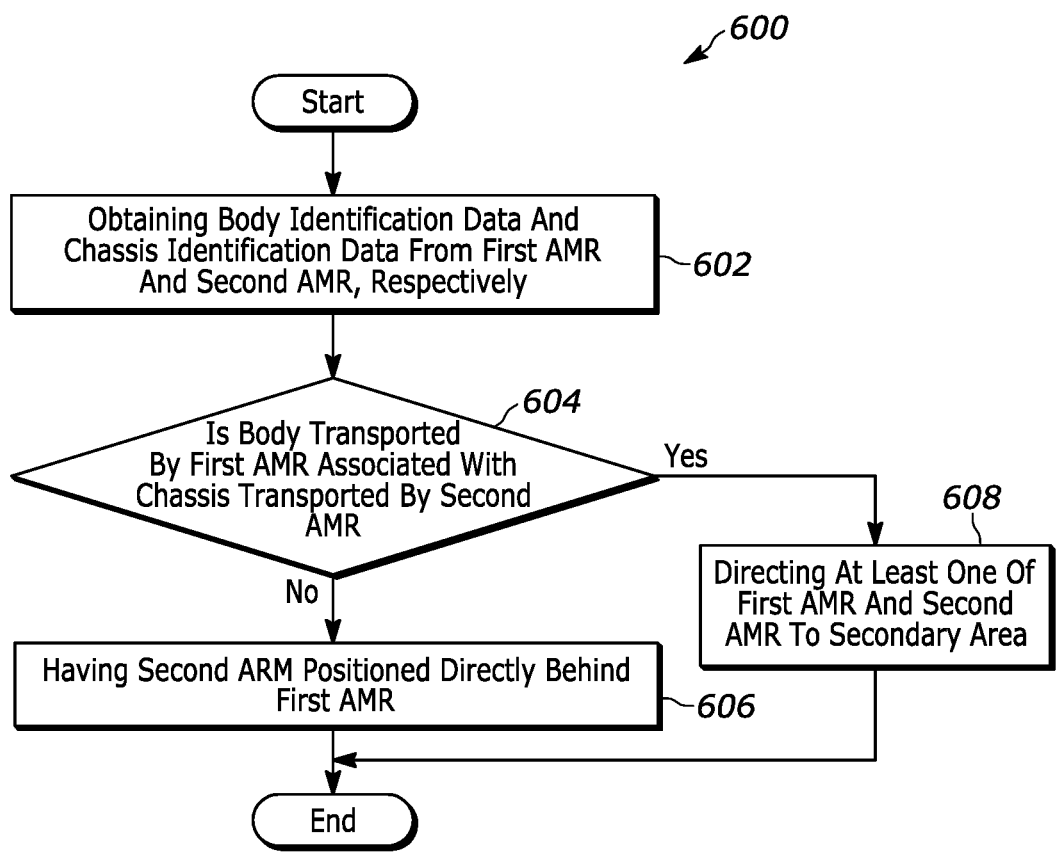
FIG. 7 is a flowchart of a vehicle verification routine of the central management system according to the teaching of the present disclosure.

When the body AMR 110A-1 and the chassis AMR 110B-1 are at the component confirmation area 152, the central management system 114 verifies that the body 106 transported by the body AMR 110A-1 is for the same vehicle as the chassis 108 being transported by the chassis AMR 110B-1. For example, referring to FIG. 7, an example of a vehicle verification routine 600 is provided and performed by the central management system 114. At 602, the central management system 114 obtains the body ID data from the body AMR 110A and the chassis ID data from the chassis AMR 1106. At 604, the central management system 114 determines whether the body 106 transported by the body AMR 110A is associated with the chassis transported by the chassis AMR 1106. Specifically, the central management system 114 determined if the body 106 and the chassis 108 are for the same vehicle based at least on the body ID data and chassis ID data. If the body 106 and the chassis 108 are not associated with each other, the central management system 114 directs at least one the body AMR 110A or the chassis AMR 1106 to another area of the facility (i.e., a secondary area) at 606. That is, the body AMR 110A and/or the chassis AMR 110 leave their respective assembly lines for further processing. If the body 106 and the chassis 108 are associated with one another, the central management system 114 directs the body AMR 110A to proceed to the component assembly line 130 and directs the chassis AMR 1106 to enter the component assembly line 130 directly behind the body AMR 110A having the associated body 106.

Referring to FIG. 3, the component assembly line 130 is configured to have the components 106, 108 in associated pairs with the body 106 entering the assembly area 132 first. In one form, the central management system 114 directs the body AMR 110A to a desired location within the assembly area 132. At the desired location, the positional sensors 111 should be able to detect the body 106 or more specifically the alignment feature of the body 106. As provided above, the positional sensors 111 outputs data indicative of the location of the body 106 in the assembly area 132 to the central management system 114, which in return determines if the body is aligned based on the body reference location. If the body 106 is not aligned, the central management system 114 instructs the body AMR 110A-4 to move such that alignment feature of the body 106 in within a desired nominal threshold of the body reference location. Once aligned, the central management system 114 instructs the body assembly robotic systems 112A to lift the body 106 and, once lifted, directs the body AMR 110A-4 to move to a desired location of the assembly area 132 which is under the body 106. For example, FIG. 4 illustrates the body assembly robotic systems 112A with the body 106 lifted and the chassis 108 provided by the chassis AMR 1106 arranged under the body 106.

Likewise, the chassis AMR 1106 reaches the desired location in the assembly area 132, and the positional sensors 111 output data to the central management system 114 regarding the location of an alignment feature of the chassis 108 (see FIG. 3). As discussed above, the central management system 114 determines whether the alignment feature of the chassis 108 is within a nominal threshold of the chassis reference location. If the alignment feature of the chassis 108 is not aligned with the chassis reference location (e.g., outside of nominal threshold), the central management system 114 instructs the chassis AMR 110B-4 to move to desired location or by a desired amount to have the alignment feature of the chassis 108 closer to the chassis reference location. Once the chassis alignment feature is aligned, the central management system 114 instructs the body assembly robotic systems 112A to lower the body 106 down onto the chassis 108 (see FIG. 4). The central management system 114 then instructs the fastening robotic systems 112B to fasten the body 106 to the chassis 108 (see FIGS. 5-6) forming the body-chassis combination 150. After the body-chassis combination 150 is formed, the central management system 114 instructs the chassis AMR 110B transporting the body-chassis combination 150 to move from the assembly area 132 to a desired area of the facility to continue assembly of the vehicle.

Referring to FIGS. 8A and 8B, a flowchart of a vehicle decking routine 700 for a body to a chassis by the central management system 114 is presented. At 702, the central management system 114 directs a first AMR (i.e., body AMR) transporting a body to an assembly area. At 706, the central management system 114 determines whether a body position of the body is aligned with a body reference position. For example, the central management system 114 determines whether the alignment feature associated with the body is positioned and aligned with the body reference position. If the body is not aligned, the central management system 114 directs the first AMR to move to adjust the position of the alignment feature of the body such that is aligns or substantially aligns with the body reference position at 708. If body is aligned, the central management system 114 directs the first set of mobile robotic systems (e.g., the set of body assembly robotic systems) to lift the body from the first AMR at 710. At 712, the central management system 114 directs the first AMR to a second area other than the assembly area.

At 714, the central management system 114 directs the second AMR transporting the chassis to a desired position relative to the body. At 716, the central management system 114 determines if the chassis being transported by the chassis AMR is aligned or substantially aligned with the chassis reference position. If no, the central management system 114 directs the second AMR to move to adjust the position of the alignment feature of the chassis such that it aligns or substantially aligns with the chassis reference position. If the chassis is aligned, the central management system 114 instructs the first set of mobile robotic systems to place the body on the chassis at 720. At 722, the central management system 114 instructs the second set of mobile robotic systems (e.g., the set of fastening robotic systems) to fasten the body to the chassis.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A manufacturing system comprising:
   a plurality of first autonomous mobile robots (AMRs), wherein each first autonomous mobile robot (AMR) is configured to transport a body from among a plurality of bodies for a plurality of vehicles;
   a plurality of second AMRs, wherein each second AMR is configured to transport a chassis from a plurality of chassis for the plurality of vehicles; and
   a central management system includes one or more processors and one or more non-transitory computer-readable mediums storing instructions that are executable by the one or more processors, wherein the instructions comprise:
      directing the plurality of the first AMRs into a first assembly line process;
      directing the plurality of the second AMRs into a second assembly line process; and
      directing an identified second AMR of the plurality of the second AMRs to move behind an identified first AMR of the plurality of the first AMRs, wherein the identified second AMR is transporting a selected chassis from among the plurality of chassis, the identified first AMR is transporting a selected body from among the plurality of bodies, wherein the selected body is associated with the selected chassis.

2. The manufacturing system of claim 1, wherein:
   each first AMR transporting a body among the plurality of bodies is configured to store a body identification data associated with the body being transported, and
   each second AMR transporting a chassis among the plurality of chassis is configured to store a chassis identification data associated with the chassis being transported.

3. The manufacturing system of claim 2, wherein the instructions further include:
   obtaining the body identification data and the chassis identification data from a desired first AMR from among the plurality of first AMRs and a desired second AMR from among the plurality of second AMRs, respectively;
   determining whether the body transported by the desired first AMR is associated the chassis being transported on the desired second AMR based on the body identification data and the chassis identification data;
   directing at least one of the desired first AMR and the desired second AMR to a secondary area in response to the body not being associated with the chassis; and
   having the desired second AMR, as the identified second AMR, positioned directly behind the desired first AMR, as the identified first AMR, in response to the body being associated with the chassis.

4. The manufacturing system of claim 3, wherein to have the desired second AMR positioned directly behind the desired first AMR, the instructions further include directing the desired second AMR to move directly behind the desired first AMR.

5. The manufacturing system of claim 3, wherein to have the desired second AMR positioned directly behind the desired first AMR, the instructions further include directing the desired first AMR to move directly in front of the desired second AMR.

6. The manufacturing system of claim 1 further comprising one or more positional sensors provided at the assembly area and configured to detect a component in the assembly area, wherein the component is at least one of the body and the chassis.

7. The manufacturing system of claim 6, wherein the instructions further comprise:
   determining a component position of the component provided at the assembly area;
   determining whether the component is aligned with a reference position based on the component position; and
   directing a component AMR to move the component to the reference position in response to the component not being aligned with the reference position, wherein the component AMR is the identified first AMR in response to the component being the body and the component AMR is the identified second AMR in response to the component being the chassis.

8. The manufacturing system of claim 1 further comprising a second set of mobile robotic systems configured to couple the body to the chassis.

9. The manufacturing system of claim 8, wherein with the body placed on the chassis, the instructions further comprises instructing the second set of mobile robotic systems to fasten the body to the chassis.

10. The manufacturing system of claim 1 further comprising:
   a first set of mobile robotic systems provided at an assembly area and configured to move the body,
   wherein the instructions further comprise:
      having the first set of mobile robotic systems lift the body from the identified first AMR;
      directing the identified first AMR to a secondary area;
      directing the identified second AMR to move to a desired position relative to the body; and
      instructing the first set of mobile robotic systems to place the body on the chassis.

11. A method for manufacturing a vehicle using a manufacturing system having a plurality of first autonomous mobile robots (AMRs) transporting a plurality of bodies for a plurality of vehicles, a plurality of second AMRs transporting a plurality of chassis for the plurality of vehicles, and a central management system, the method comprising:
   directing, by the central management system, the plurality of first AMRs into a first assembly line process, wherein each first autonomous mobile robot (AMR) is configured to transport a body from among the plurality of bodies;
   directing, by the central management system, the plurality of the second AMRs into a second assembly line process, wherein each second AMR is configured to transport a chassis from the plurality of chassis; and
   having, by the central management system, an identified second AMR from among the plurality of the second AMRs to move behind an identified first AMR from among the plurality of the first AMRs, wherein the identified second AMR is transporting a selected chassis from among the plurality of chassis, the identified first AMR is transporting a selected body from among the plurality of bodies, wherein the selected body is associated with the selected chassis.

12. The method of claim 11 further comprises:
   storing, by each first AMR transporting a body among the plurality of bodies, a body identification data associated with the body being transported, and
   storing, by each second AMR transporting a chassis among the plurality of chassis, a chassis identification data associated with the chassis being transported.

13. The method of claim 12 further comprising:
   obtaining, by the central management system, the body identification data and the chassis identification data from a desired first AMR from among the plurality of first AMRs and a desired second AMR from among the plurality of second AMRs, respectively;
   determining, by the central management system, whether the body transported by the desired first AMR is associated the chassis being transported on the desired second AMR based on the body identification data and the chassis identification data;
   directing, by the central management system, at least one of the desired first AMR and the desired second AMR to a secondary area in response to the body not being associated with the chassis; and
   having, by the central management system, the desired second AMR, as the identified second AMR, positioned directly behind the desired first AMR, as the identified first AMR, in response to the body being associated with the chassis.

14. The method of claim 13, wherein the having the desired second AMR positioned directly behind the desired first AMR, the method further comprises directing the desired second AMR to move directly behind the desired first AMR.

15. The method of claim 13, wherein to have the desired second AMR positioned directly behind the desired first AMR, the method further comprises directing the desired first AMR to move directly in front of the desired second AMR.

16. The method of claim 11, wherein the manufacturing system further includes a first set of mobile robotic systems provided at an assembly area and configured to move the body, the method further comprises:
   instructing, by the central management system, the first set of mobile robotic systems to lift the body from the identified first AMR;
   directing, by the central management system, the identified first AMR to a secondary area;
   directing, by the central management system, the identified second AMR to move to a desired position relative to the body; and
   instructing, by the central management system, the first set of mobile robotic systems to place the body on the chassis.

17. The method of claim 11, wherein the manufacturing system further includes one or more positional sensors provided at the assembly area and configured to detect a component in an assembly area, the method further comprises:
   determining, by the central management system, a component position of the component provided at the assembly area, wherein the component is at least one of the body and the chassis;
   determining, by the central management system, whether the component is aligned with a reference position based on the component position; and
   directing, by the central management system, a component AMR to move the component to the reference position in response to the component not being aligned with the reference position, wherein the component AMR is the first AMR in response to the component being the body and the component AMR is the second AMR in response to the component being the chassis.

18. The method of claim 11, wherein the manufacturing system further includes a second set of mobile robotic systems configured to fasten the body to the chassis, the method further comprising, with the body placed on the chassis, instructing the second set of mobile robotic systems to fasten the body to the chassis.

19. A manufacturing system comprising:
a plurality of first autonomous mobile robots (AMRs), wherein each first autonomous mobile robot (AMR) is configured to transport a body from among a plurality of bodies for a plurality of vehicles and is configured to store a body identification data associated with the body being transported;
a plurality of second AMRs, wherein each second AMR is configured to transport a chassis from a plurality of chassis for the plurality of vehicles and is configured to store a chassis identification data associated with the chassis being transported; and
a central management system includes one or more processors and one or more nontransitory computer-readable mediums storing instructions that are executable by the one or more processors, wherein the instructions comprise:
  directing the plurality of the first AMRs into a first assembly line process;
  directing the plurality of the second AMRs into a second assembly line process;
  obtaining the body identification data and the chassis identification data from a desired first AMR from among the plurality of first AMRs and a desired second AMR from among the plurality of second AMRs, respectively;
  determining whether the body transported by the desired first AMR is associated the chassis being transported on the desired second AMR based on the body identification data and the chassis identification data;
  directing at least one of the desired first AMR and the desired second AMR to a secondary area in response to the body not being associated with the chassis; and
having the desired second AMR, as an identified second AMR, positioned directly behind the desired first AMR, as an identified first AMR, in response to the body being associated with the chassis.

20. The manufacturing system of claim 19 further comprising:
a first set of mobile robotic systems provided at an assembly area and configured to move the body,
wherein the instructions further comprise:
  having the first set of mobile robotic systems lift the body from the identified first AMR;
  directing the identified first AMR to the secondary area;
  directing the identified second AMR to move to a desired position relative to the body; and
  instructing the first set of mobile robotic systems to place the body on the chassis.

* * * * *